United States Patent
Zhang et al.

(10) Patent No.: US 9,654,749 B2
(45) Date of Patent: May 16, 2017

(54) PROJECTION METHODS AND PROJECTION DEVICES

(71) Applicant: LENOVO (BEIJING) LIMITED, Beijing (CN)

(72) Inventors: Xiaoping Zhang, Beijing (CN); Lu Cao, Beijing (CN); Yaqiang Wu, Beijing (CN); Zhepeng Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 241 days.

(21) Appl. No.: 14/228,383

(22) Filed: Mar. 28, 2014

(65) Prior Publication Data
US 2015/0042684 A1  Feb. 12, 2015

(30) Foreign Application Priority Data

Aug. 9, 2013 (CN) .......................... 2013 1 0347216

(51) Int. Cl.
*G09G 5/00* (2006.01)
*H04N 9/31* (2006.01)
(Continued)

(52) U.S. Cl.
CPC .............. *H04N 9/3185* (2013.01); *G06T 3/00* (2013.01); *G06T 7/0002* (2013.01); *G06T 7/181* (2017.01); *G06T 2207/30168* (2013.01)

(58) Field of Classification Search
None
See application file for complete search history.

(56) References Cited

U.S. PATENT DOCUMENTS 6,802,614 B2 * 10/2004 Haldiman .............. G03B 21/00
  353/30
7,380,946 B1 * 6/2008 Teng ........................ G03B 5/04
  345/611

(Continued)

FOREIGN PATENT DOCUMENTS

CN   1465178 A   12/2003
CN   102387330 A   3/2012

*Primary Examiner* — Ryan R Yang
(74) *Attorney, Agent, or Firm* — Kinney & Lange, P.A.

(57) ABSTRACT

The present disclosure discloses a projection method and an electronic device, belong to an image processing field. The method comprises: obtaining a first image, and obtaining an adjustment instruction, wherein the first image corresponds to first content; adjusting the first image to a second image according to the adjustment instruction, the second image comprising a target image corresponding to the first content; and projecting the second image; wherein when the second image is projected onto intersected planes formed by at least two planes, if an edge of the target image is intersected with an intersection line of the intersected planes, the edge of the target image is or is approximately perpendicular to the intersection line of the intersection planes. The present disclosure adjusts the first image to the second image, and projects the second image, so that when the second image projects onto the intersected planes formed by at least two planes, if the edge of the target image included in the second image is intersected with the intersection line of the intersected plane, the edge of the target image is or is approximately perpendicular to the intersection line of the intersection planes. Thus, the target image may be normally displayed and deformation may not occur.

6 Claims, 6 Drawing Sheets

(51) Int. Cl.
G06T 7/00 (2017.01)
G06T 3/00 (2006.01)
G06T 7/181 (2017.01)

(56) References Cited

U.S. PATENT DOCUMENTS

| | | | | |
|---|---|---|---|---|
| 7,901,095 B2* | 3/2011 | Xiao | ............... | H04N 9/3147 |
| | | | | 345/644 |
| 7,961,197 B1* | 6/2011 | Diamond | ............. | H04N 9/3185 |
| | | | | 345/426 |
| 2003/0222892 A1* | 12/2003 | Diamond | ............. | H04N 9/3185 |
| | | | | 345/647 |
| 2005/0162620 A1* | 7/2005 | Taguchi | ................ | G03B 21/14 |
| | | | | 353/69 |
| 2007/0097326 A1* | 5/2007 | Yang | ..................... | G03B 21/14 |
| | | | | 353/69 |
| 2011/0216288 A1* | 9/2011 | Rutledge | ............. | H04N 9/3185 |
| | | | | 353/70 |
| 2012/0032978 A1* | 2/2012 | Chae | .................. | H04N 9/3147 |
| | | | | 345/644 |
| 2012/0212627 A1 | 8/2012 | Klose | | |
| 2014/0002503 A1* | 1/2014 | Saigo | .................... | G06T 5/008 |
| | | | | 345/647 |
| 2014/0267427 A1* | 9/2014 | Hasegawa | ............... | G06T 5/006 |
| | | | | 345/647 |
| 2014/0320825 A1* | 10/2014 | Kim | ........................ | E04H 3/22 |
| | | | | 353/31 |
| 2015/0070663 A1* | 3/2015 | Watanuki | ............ | G03B 21/145 |
| | | | | 353/70 |

* cited by examiner

PROJECTION METHODS AND PROJECTION DEVICES

TECHNICAL FIELD

The present disclosure relates to an image processing field, and particularly, to projection methods and projection devices.

BACKGROUND

Figure 1:
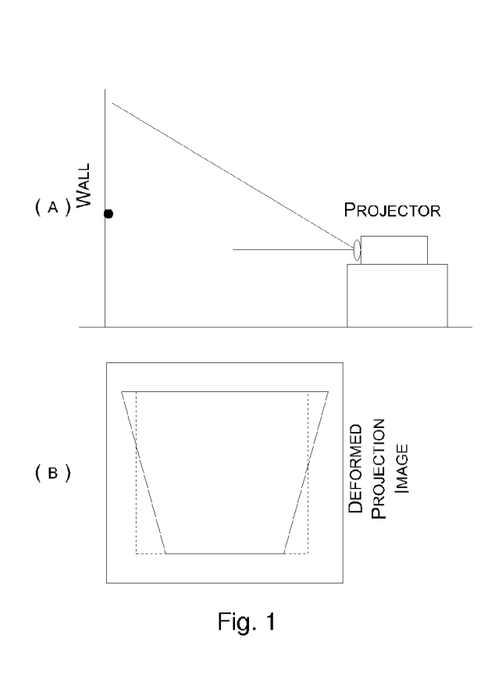
FIG. 1 shows a schematic diagram of deformation occurring to a projector when a projector projects images.

In occasions such as an office conference, multimedia teaching or entertainments, a projector may generally be used for projecting images onto a wall or a projection screen, so as to render a larger picture. In a process of using the projector, it is difficult to arrange a projection direction of the projector perpendicular to the wall and facing a center of the projection screen or the wall. Thus, when the projector emits a projection beam, diffusion of the projection beam reaching a part of the wall nearer to the projector is smaller than that of the projection beam reaching a part of the wall farther to the projector, so that an upper and a lower edges or a left and a right edges of a corresponding projection image have different lengths, which causes deformation on the projection image which is originally a rectangle and a server distortion of the projection image. For example, in FIG. 1 (a), the projector is located under the center of the wall. The diffusion of the projection beam reaching the lower part of the wall is smaller than that of the projection beam reaching the upper part of the wall, and thus the deformation occurs on the projection image, so as to obtain a trapezoid as shown in FIG. 1 (b). Therefore, it is required to calibrate the projection image, in order to display a normal projection image.

During projection, before the projection of the projector, a calibration matrix may be set according to a relative distance between the projector and a projection plane; a whole projection image may be calibrated according to the calibration matrix. When the whole projection image is calibrated according to the calibration matrix, the projection image is deformed according to a form reverse to the formation after the projection, so that the deformation of the calibrated projection image and the deformation after the projection may be cancelled. Then, the calibrated projection image may be projected to the projection plane.

However, the inventor found at least a technical problem in the above techniques as follows during implementation of technical solutions in embodiments of the present disclosure.

When the projection image needs to be projected to a plurality of projection planes, the calibration matrix is set according to the relative distance between the projector and one projection plane, then the whole projection image is calibrated by the calibration matrix. That is, the same calibration matrix is used for the whole projection image, so that the projection image on one of the projection planes may be displayed normally, while the projection images on other projection planes may still deform. Therefore, calibration accuracy of the projection method is not high.

SUMMARY OF INVENTION

In order to solve the technical problem, embodiments of the present disclosure provide a projection method and a projection device as follows.

On one hand, a projection method is provided. The projection method includes: obtaining a first image and obtaining an adjustment instruction, wherein the first image corresponds to first content; adjusting the first image to a second image according to the adjustment instruction, the second image including a target image corresponding to the first content; and projecting the second image; wherein when the second image is projected onto intersected planes formed by at least two planes, if an edge of the target image is intersected with an intersection line of the intersected planes, the edge of the target image is or is approximately perpendicular to the intersection line of the intersection planes.

Preferably, obtaining the adjustment instruction includes: projecting the first image; collecting an projection image of the first image, and judging whether the projection image of the first image reaches a predetermined projection requirement; and triggering an adjustment and obtaining the adjustment instruction, if the projection image of the first image does not reach the predetermined projection requirement.

Preferably, adjusting the first image to the second image according to the adjustment instruction includes: dividing the first image to a preset number of sub-images, the preset number being equal to a number of planes contained in the intersected planes; and calibrating each of the sub-images of the first image respectively, so as to obtain the calibrated sub-images as the second image.

Preferably, dividing the first image to the preset number of sub-images includes: determining an imaging proportion of the first image on each of the intersected planes; and dividing the first image to the preset number of sub-images, according to the imaging proportion of the first image on each of the intersected planes.

Preferably, determining the imaging proportion of the first image on each of the intersected planes includes: detecting an edge of the first image intersected with the intersection line of the intersected planes; and determining the imaging proportion of the first image on each of the intersected planes, according to the edge of the first image intersected with the intersection line of the intersected planes.

Preferably, before each of the sub-images of the first image are calibrated respectively, the method further includes: presetting a corresponding calibration matrix for each of the sub-images of the first image; wherein calibrating each of the sub-images of the first image respectively includes: determining the calibration matrix preset for each of the sub-images of the first image, and calibrating each of the sub-images of the first image according to the calibration matrix corresponding to each of the sub-images of the first image.

Preferably, presetting a corresponding calibration matrix for each of the sub-images of the first image includes: determining a relative distance between the projector and each of the intersected planes; and setting the corresponding calibration matrix for each of the intersected planes, according to the relative distance between the projector and each of the intersected planes; and determining a plane of the intersected planes corresponding to each of the sub-images of the first image, and using the calibration matrix corresponding to each of the intersected planes as a calibration matrix corresponding to the sub-image projected onto the plane.

On the other hand, a projection device is provided. The electronic device includes: a first obtaining module configured for obtaining a first image, the first image corresponds to first content; a second obtaining module configured for obtaining an adjustment instruction; an adjustment module configured for adjusting the first image to a second image according to the adjustment instruction, the second image including a target image corresponding to the first content;

and a projection module configured for projecting the second image; wherein when the second image is projected onto intersected planes formed by at least two planes, if an edge of the target image is intersected with an intersection line of the intersected planes, the edge of the target image is or is approximately perpendicular to the intersection line of the intersection planes.

Preferably, the second obtaining module includes: a projection unit configured for projecting the first image; a collection unit configured for collecting an projection image of the first image; a judgment unit configured for judging whether the projection image of the first image reaches a predetermined projection requirement; and an obtaining unit configured for triggering an adjustment and obtaining the adjustment instruction, if the projection image of the first image does not reach the predetermined projection requirement.

Preferably, the adjustment module includes: a division sub-module configured for dividing the first image to a preset number of sub-images, the preset number being equal to a number of planes contained in the intersected planes; and a calibration sub-module configured for calibrating each of the sub-images of the first image respectively, so as to obtain the calibrated sub-images as the second image.

Preferably, the division sub-module includes: a determination unit configured for determining an imaging proportion of the first image on each of the intersected planes; and a division unit configured for dividing the first image to the preset number of sub-images, according to the imaging proportion of the first image on each of the intersected planes.

Preferably, the determination unit is configured for detecting an edge of the first image intersected with the intersection line of the intersected planes; and determining the imaging proportion of the first image on each of the intersected planes, according to the edge of the first image intersected with the intersection line of the intersected planes.

Preferably, the adjustment module further includes: a setting sub-module configured for presetting a corresponding calibration matrix for each of the sub-images of the first image; the calibration sub-module configured for determining the calibration matrix preset for each of the sub-images of the first image, and calibrating each of the sub-images of the first image according to the calibration matrix corresponding to each of the sub-images of the first image.

Preferably, the setting sub-module is configured for determining a relative distance between the projector and each of the intersected planes; and setting the corresponding calibration matrix for each of the intersected planes, according to the relative distance between the projector and each of the intersected planes; and determining a plane of the intersected planes corresponding to each of the sub-images of the first image, and using the calibration matrix corresponding to each of the intersected planes as a calibration matrix corresponding to the sub-image projected onto the plane.

The technical solutions provided by the embodiments of the present disclosure have beneficial effects as follows:

The first image is adjusted to the second image according to the obtained instruction, and the second image is projected, so that when the second image projects onto the intersected planes formed by at least two planes, if the edge of the target image included in the second image is intersected with the intersection line of the intersected plane, the edge of the target image is or is approximately perpendicular to the intersection line of the intersection planes. Thus, the target image may be normally displayed and deformation may not occur.

BRIEF DESCRIPTION OF THE DRAWINGS

In order to illustrate the technical solutions in the embodiments of the present invention more clearly, drawings used for description on the embodiments will be introduced simply. Obviously, the drawings are only for some embodiments of the present invention. Other drawings may also be obtained according to these drawings by the skilled in the art without any creative labor.

DETAILED DESCRIPTION

Hereinafter, implementations of the present disclosure will be described in detail in connection with the drawings, in order to better clarify objects, technical solutions and advantages of the present disclosure.

Embodiment One

Figure 2:
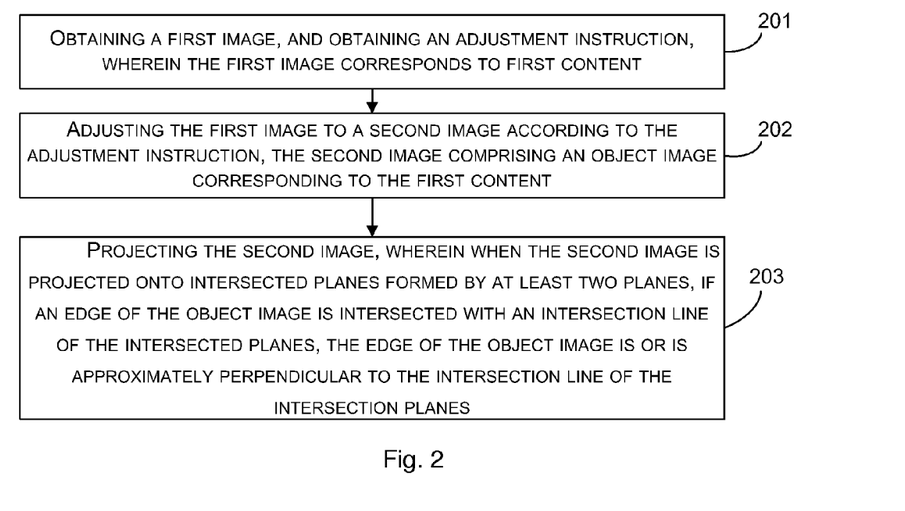
FIG. 2 shows a flowchart of a projection method in Embodiment One of the present disclosure.

An embodiment of the present disclosure discloses a projection method. Referring to FIG. 2, the method may include the steps as follows.

Step 201: obtaining a first image and obtaining an adjustment instruction, wherein the first image corresponds to first content. wherein obtaining the adjustment instruction may include, but not limited to: projecting the first image; collecting an projection image of the first image, and judging whether the projection image of the first image reaches a predetermined projection requirement; and triggering an adjustment and obtaining the adjustment instruction, if the projection image of the first image does not reach the predetermined projection requirement.

Step 202: adjusting the first image to a second image according to the adjustment instruction, the second image including a target image corresponding to the first content.

In particular, adjusting the first image to the second image according to the adjustment instruction may include, but not limited to: dividing the first image to a preset number of sub-images, the preset number being equal to a number of planes contained in the intersected planes; and calibrating each of the sub-images of the first image respectively, so as to obtain the calibrated sub-images as the second image.

Preferably, dividing the first image to the preset number of sub-images may include: determining an imaging proportion of the first image on each of the intersected planes; and dividing the first image to the preset number of sub-images, according to the imaging proportion of the first image on each of the intersected planes.

Preferably, determining the imaging proportion of the first image on each of the intersected planes may include: detecting an edge of the first image intersected with the intersection line of the intersected planes; and determining the imaging proportion of the first image on each of the intersected planes, according to the edge of the first image intersected with the intersection line of the intersected planes.

Preferably, before each of the sub-images of the first image are calibrated respectively, the method may further include: presetting a corresponding calibration matrix for each of the sub-images of the first image; wherein calibrating each of the sub-images of the first image respectively may include: determining the calibration matrix preset for each of the sub-images of the first image, and calibrating each of the sub-images of the first image according to the calibration matrix corresponding to each of the sub-images of the first image.

Preferably, presetting a corresponding calibration matrix for each of the sub-images of the first image may include: determining a relative distance between the projector and each of the intersected planes; and setting the corresponding calibration matrix for each of the intersected planes, according to the relative distance between the projector and each of the intersected planes; and determining a plane of the intersected planes corresponding to each of the sub-images of the first image, and using the calibration matrix corresponding to each of the intersected planes as a calibration matrix corresponding to the sub-image projected onto the plane.

Step 203: projecting the second image; wherein when the second image is projected onto intersected planes formed by at least two planes, if an edge of the target image is intersected with an intersection line of the intersected planes, the edge of the target image is or is approximately perpendicular to the intersection line of the intersection planes.

The method provided by the embodiment of the present disclosure adjusts the first image to the second image according to the obtained adjustment instruction, and projects the second image, so that when the second image projects onto the intersected planes formed by at least two planes, if the edge of the target image included in the second image is intersected with the intersection line of the intersected plane, the edge of the target image is or is approximately perpendicular to the intersection line of the intersection planes. Thus, the target image may be normally displayed and deformation may not occur.

Embodiment Two

In order that a projection image may be displayed accurately on a plurality of projection planes when a projector projects an image simultaneously to a plurality of planes, a projection method is provided by an embodiment of the present disclosure. A subject performing the method provided by the embodiment of the present disclosure may be a projection device capable of projecting the image onto the plane, particularly, a projector etc. Here, the embodiment of the present disclosure does not make any limitation on the projection device. The project is only taken as an example for illustration. In connection with description on Embodiment One, referring to FIG. 3, the method may include the steps as follows.

Figure 3:
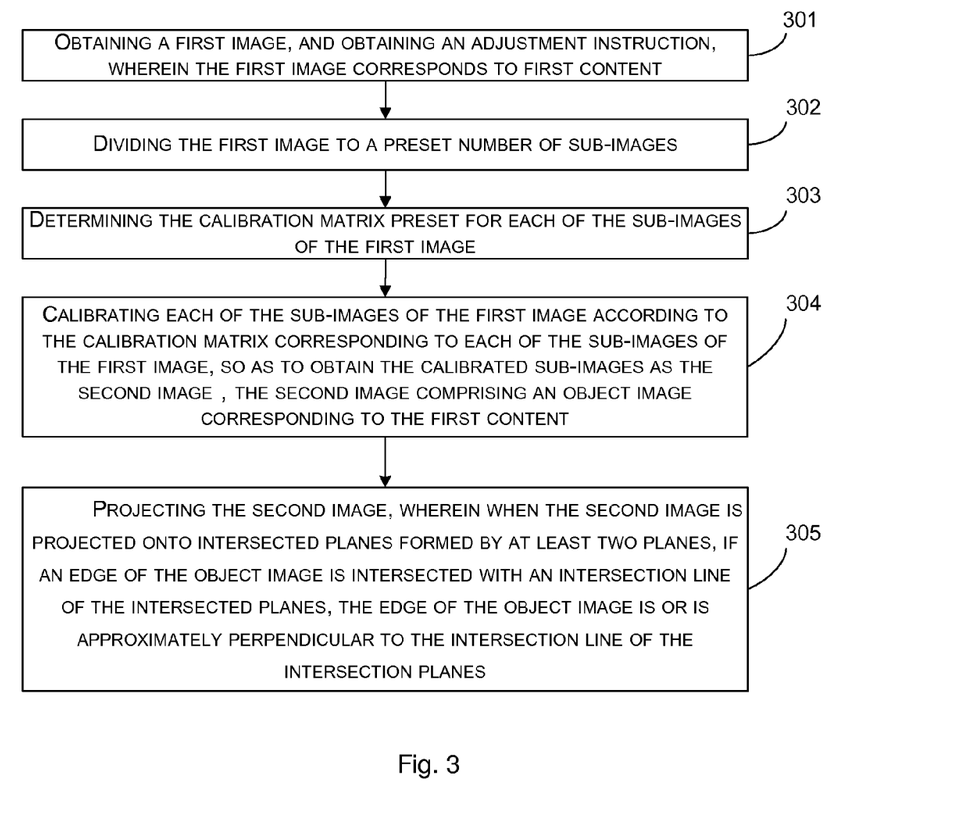
FIG. 3 shows a flowchart of a projection method in Embodiment Two of the present disclosure.

Step 301: obtaining a first image and obtaining an adjustment instruction, wherein the first image corresponds to first content.

In particular, there may be various methods of obtaining the first image. For example, the first image may be obtained by photograph of a photographing device in or externally connected to the projector, or may be obtained by transferring images to the projector from other devices. The present embodiment does not limit the approach of obtaining the first image. Regardless the ways of obtaining the first image, the first image corresponds to first content. After the first image is obtained, in order that the first content corresponding to the first image may be normally displayed on the projection plane, the method provided by the present embodiment may further include a process of obtaining the adjustment instruction so as to adjust the first image according to the adjustment instruction by subsequent steps.

The present embodiment does not limit the way of obtaining the adjustment instruction. In a specific implementation, a manual switching module may be provided for obtaining the adjustment instruction after the user triggers the switching mode manually. Additionally, the way of obtaining the adjustment instruction may include, but not limited to, projecting the first image; collecting an projection image of the first image, and judging whether the projection image of the first image reaches a predetermined projection requirement; and triggering an adjustment and obtaining the adjustment instruction, if the projection image of the first image does not reach the predetermined projection requirement.

The present embodiment does not limit the way of the predetermined projection requirement. In a specific implementation, it may be determined according to actual situations. For example, when the first image is projected onto the intersected planes formed by at least two planes, the predetermined projection requirement may be set as all the projected projection image on respective planes of the intersected planes are rectangles. Therefore, when the first image is projected, the projection image of the first image is collected, and it is determined whether all the projection image of the first image on respective planes of the intersected planes are rectangles. If not, it may be determined that the projection image of the first image does not reach the predetermined projection requirement, so as to trigger adjustment on the first image to obtain the adjustment instruction.

Step 302: dividing the first image to a preset number of sub-images.

For this step, since the projector may project the first image onto the intersected planes formed by the plurality of planes, each of the intersected planes will display a part of the first image, the part of the first image being a sub-image of the first image. Therefore, the preset number may be equal to a number of planes contained in the intersected planes. The intersected plane may be a plane onto which the projector will project the first image, e.g., a wall, a ground or a projection screen etc. The method of the embodiment of the present disclosure is especially suitable for the case where the image is projected to the plurality of planes. Therefore, the number of the planes contained in the intersected planes is 2 at least.

In particular, dividing the first image to the preset number of sub-images may include, but not limited to: determining an imaging proportion of the first image on each of the intersected planes; and dividing the first image to the preset number of sub-images, according to the imaging proportion of the first image on each of the intersected planes.

In the above implementation, determining the imaging proportion of the first image on each of the intersected planes may include, but not limited to: detecting an edge of the first image intersected with the intersection line of the intersected planes; and determining the imaging proportion of the first image on each of the intersected planes, according to the edge of the first image intersected with the intersection line of the intersected planes.

Wherein, dividing the first image to the preset number of sub-images, according to the imaging proportion of the first image on each of the intersected planes particularly means: dividing the first image to the preset number of sub-images, a proportion of each sub-image being identical with the imaging proportion of the first image on each of the intersected planes.

Further, since the intersection lines of the intersected planes on the image display may be different relative to other parts of respective planes of the intersected planes, e.g. an image detection method may be used for detecting that the edge in the first image intersected with the intersection line of the intersected planes. A detected number of edges is related to the number of the planes of the intersected planes and position relationships thereof. For example, if the intersected planes have two planes, it may be detected that there is one edge in the first image intersected with the intersection line of the intersected planes; and if the intersected planes have three planes, it may be detected that there are two or three edge in the first image intersected with the intersection line of the intersected planes. Determining the imaging proportion of the first image on each of the intersected planes according to the edge of the first image intersected with the intersection line of the intersected planes may include: the projection image of the first image may be divided to images on respective planes of the intersected planes, according to the edge of the first image intersected with the intersection line of the intersected planes; and calculating image areas on respective planes of the intersected planes; and calculating the imaging proportion of the first image on each of the intersected planes, according to a proportion of the image areas on the respective planes of the intersected planes and a total area of the projection image of the first image. In addition, other methods may also be used for determining the imaging proportion of the first image on each of the intersected planes according to the edge of the first image intersected with the intersection line of the intersected planes. For example, if the intersected planes only contains two planes, a length proportion or width ratio of two parts of the projection image divided by the edge in the first image intersected with the intersection line of the intersected planes may be determined according to the edge, and the imaging proportion of the first image on each of the intersected planes may be determined according to the length proportion or width ratio of the two parts of the projection image. Particular implementations of determining the imaging proportion of the first image on each of the intersected planes according to the edge in the first image intersected with the intersection line of the intersected planes are not limited here by the embodiment of the present disclosure.

Figure 4:
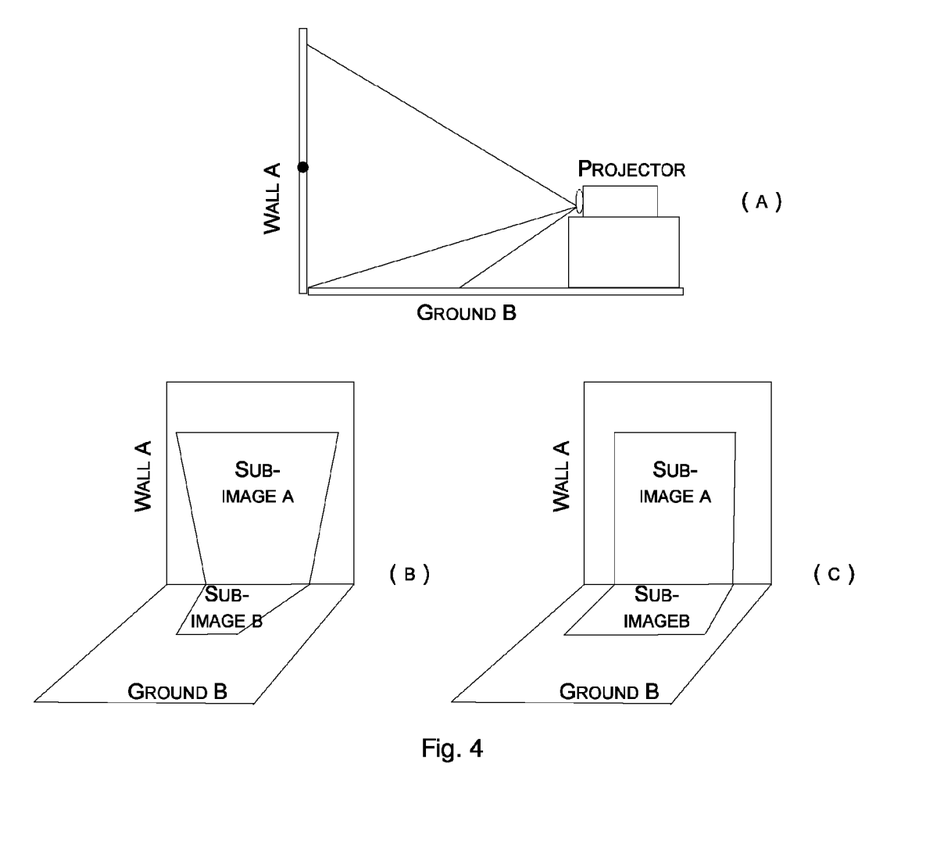
FIG. 4 shows a schematic diagram of deformation occurring to a projector and being calibrated when a projector projects images in Embodiment Two of the present disclosure.
Figure 5:
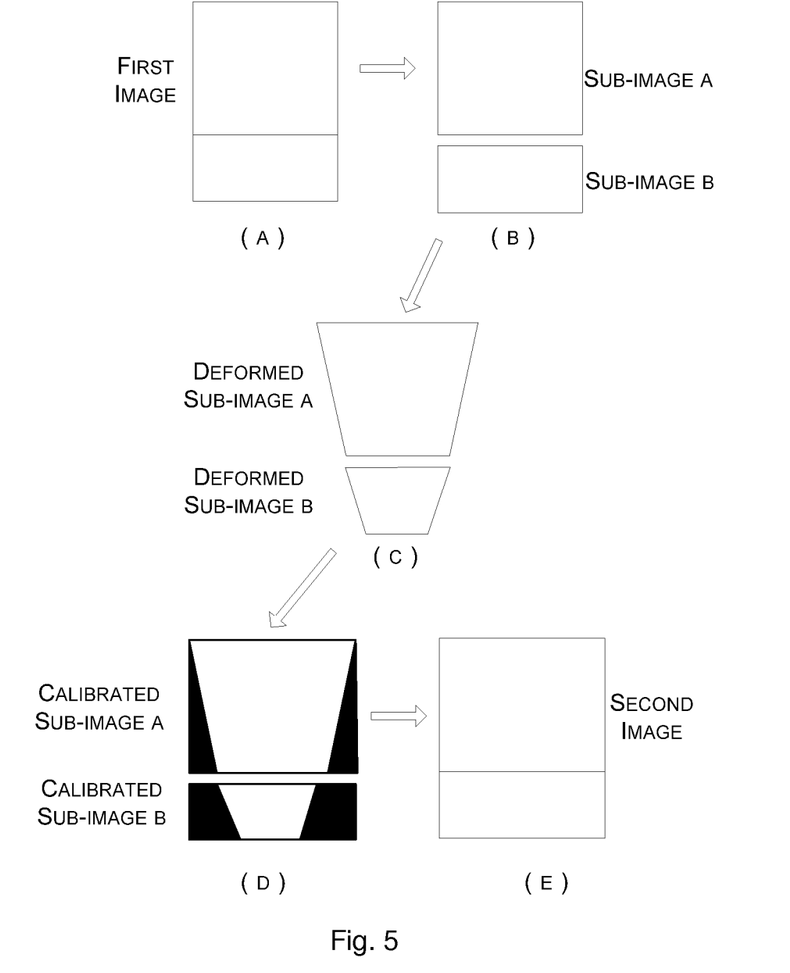
FIG. 5 shows a schematic diagram of deformation occurring to a projector and being calibrated when a projection image is projected onto a projection plane in Embodiment Two of the present disclosure.

For example, as shown in FIG. 4 (a), the projector intends to project the first image onto the intersected planes formed by two planes of Wall A and Ground B. The first image may be shown in FIG. 5 (a). The edge in the first image intersected with the intersection line of Wall A and Ground B contained in the intersected planes may be detected; it may be determined according to the edge that the width ratio of the two parts of the projection image of the first image divided by the edge is 2:1; dividing the first image into two sub-images according to the ratio 2:1, i.e., a sub-image a and a sub-image b. The ratio of the sub-image a and the sub-image b is 2:1, so as to obtain the sub-image a and the sub-image b of the first image as shown in FIG. 5 (b).

Besides, other approaches may also be used for dividing the first image to the preset number of sub-images, which are not limited here by the embodiments of the present disclosure.

Step 303: determining the calibration matrix preset for each of the sub-images of the first image.

With respect to this step, when the projector directly projects the first image onto the plurality of planes of the intersected planes, the projector always cannot arrange the first image in the center of the projection plane. Diffusion distances of the projection beam projected by the projector onto the upper and the lower edges or the left and the right edges of each of the intersected planes may be different. Therefore, the sub-images projected onto the respective planes of the intersected planes may have deformation, which is generally trapezoid deformation.

For example, the first image as shown in FIG. 5 (a) is taken as an example again. The first image is directly projected to the intersected planes formed by Wall A and Ground B. In the image as shown in FIG. 4 (b), the trapezoid deformation occurs on both the sub-image a and the sub-image b. The deformed sub-image a and sub-image b are shown in FIG. 5 (c).

Since the above deformation occurs when the project projects the first image, a corresponding calibration matrix needs to be set for each sub-image of the first image, which may include, but not limited to, determining the relative distance between the projector and each of the intersected planes. Since the relative distances between the projector and the plurality of planes of the intersected planes are different, the corresponding calibration matrix for each of the intersected planes may be set according to the relative distance between the projector and each of the intersected planes; and after it is determined that each sub-image is projected onto a corresponding plane, the calibration matrix corresponding to each of the intersected planes may be used as a calibration matrix corresponding to the sub-image projected onto the plane.

Further, the present embodiment does not limit the set specific calibration matrix. In a specific implementation, the calibration matrix may calculate deformation generated by the projection image when each sub-image of the first image is projected onto each of the intersected planes, according to the relative distance between the projector and each of the intersected planes, so that the deformation and the deformation generated by the projection image of each sub-images of the first image projected onto each of the intersected planes before calibration are reversed. Thus, the purpose of cancelling the deformation of the projected first image may be achieved finally.

The first image as shown in FIG. 5 (b) is taken as an example again. Both the sub-image a and the sub-image b of the first image are rectangle. However, after being projected onto respective planes of the intersected planes, both the sub-image a and the sub-image b of the first image are deformed, and the deformed sub-image a and sub-image b are shown in FIG. 5 (c). Therefore, in order that the projection image of the first image is not deformed after the projector projects the first image onto respective planes of the intersected planes, i.e., is still a rectangle, the corresponding calibration matrix may be set for each sub-image of the first image. Thus, the calibration matrix corresponding to each sub-image may be used for calibrating each sub-image of the first image before the first image is projected, so that the projection image obtained by the calibrated sub-images being projected onto respective planes of the intersected planes has the same shape as the first image before projection.

Step 304: calibrating each of the sub-images of the first image according to the calibration matrix corresponding to each of the sub-images of the first image, so as to obtain the calibrated sub-images as the second image, the second image including a target image corresponding to the first content.

In particular, the present embodiment does not limit the method of calibrating each of the sub-images of the first image according to the calibration matrix corresponding to each of the sub-images of the first image. In order that no deformation occurs to the projection image after the sub-image of the first image is projected onto the intersected planes, the sub-image which is originally a rectangle may be calibrated to be a trapezoid, so as to guarantee that a rectangular projection image may be formed when the sub-image of the trapezoid is projected onto the plane of the intersected planes. However, since the projector cannot project the trapezoid image, the sub-images of the first image may be calibrated to trapezoids respectively, and black may be added on a basis of the trapezoids, so that all of the calibrated sub-images may be rectangles or squares, but content of the calibrated sub-image is trapezoid, which makes the content projected to the intersected planes to be a rectangle.

The first image as shown in FIG. 5 (a) is taken as an example again. With respect to the sub-image a and the sub-image b of the first image as shown in FIG. 5 (b), after the calibration matrix corresponding to the sub-image a and the calibration matrix corresponding to the sub-image b are determined in step 303, and the sub-image a is calibrated according to the calibration matrix corresponding to the sub-image a and the sub-image b is calibrated according to the calibration matrix corresponding to the sub-image b, the calibrated sub-image a and the calibrated sub-image b may be obtained, as shown in FIG. 5 (d). The calibrated sub-image a and the calibrated sub-image b are still rectangles. The calibrated sub-image a and the calibrated sub-image b are combined to obtain the second image which is got after the first image is adjusted. A sum of a white area in the calibrated sub-image a and a white area in the calibrated sub-image b corresponds to the first content corresponding to the first image, which is called as an target image. Thus, the second image includes the target image.

Step 305: Projecting the second image, wherein when the second image is projected onto intersected planes formed by at least two planes, if an edge of the target image is intersected with an intersection line of the intersected planes, the edge of the target image is or is approximately perpendicular to the intersection line of the intersection planes.

With respect to this step, after each sub-image of the first image is calibrated according to the calibration matrix corresponding to each sub-image of the first image, the calibrated sub-image may be used as the second image, and the target image included in the second image is the deformed image. Such deformation is reverse to the deformation generated by projecting the first image onto the plane of the intersected plane. Therefore, after the calibrated sub-images, as the second image, are projected onto respective planes of the intersected planes respectively, the images displayed on the respective planes of the intersected planes are normal sub-images. Since the second image consists of the sub-images displayed on the respective planes of the intersected planes, the projected second image may be displayed normally.

For example, as shown in FIG. 4 (c), the calibrated sub-image a is projected onto Wall A, the calibrated sub-image b is projected onto corresponding Ground B, and the sub-image a projected onto Wall A and the sub-image b projected onto Ground B are rendered as shown in FIG. 5 (e). As seen from FIG. 5 (e), the sub-images displayed on Wall A and Ground B are target images of the second image. The parts other than the target images in the second image are not displayed when projection, since they are filled with black. Furthermore, the target image corresponds to the first content. Therefore, the first content may be rendered completely on the intersected planes without deformation. Hence, the projection image of the second image after projection and the projection image of the first image after projection have the same content.

It should be noted that FIGS. 4 and 5 are only examples of projecting the first and the second images onto the intersected planes formed by two planes, for illustration of the projection method provided by the present embodiment. However, the method provided by the present embodiment is not only limited to projecting the image onto the intersected planes formed by two planes. The method provided by the present embodiment may also apply to the intersected planes formed by two or more planes. The principle is the same as that of projecting the image onto the intersected planes formed by two planes. The description thereof will be omitted here.

In summary, the method provided by the embodiment of the present disclosure adjusts the first image to the second image according to the obtained adjustment instruction, and projects the second image, so that when the second image projects onto the intersected planes formed by at least two planes, if the edge of the target image included in the second image is intersected with the intersection line of the intersected plane, the edge of the target image is or is approximately perpendicular to the intersection line of the intersection planes. Thus, the target image may be normally displayed and deformation may not occur.

Embodiment Three

Figure 6:
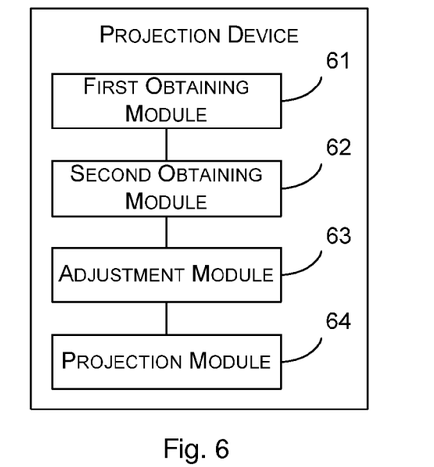
FIG. 6 shows a schematic diagram of a structure of a projection device in Embodiment Three of the present disclosure.

An embodiment of the present disclosure provides a projection device for performing the projection method provided by Embodiment One or Two. Referring to FIG. 6, the electronic device may include: a first obtaining module 61 configured for obtaining a first image, the first image corresponds to first content; a second obtaining module 62 configured for obtaining an adjustment instruction; an adjustment module 63 configured for adjusting the first image to a second image according to the adjustment instruction, the second image including a target image corresponding to the first content; and a projection module 64 configured for projecting the second image; wherein when the second image is projected onto intersected planes formed by at least two planes, if an edge of the target image is intersected with an intersection line of the intersected planes, the edge of the target image is or is approximately perpendicular to the intersection line of the intersection planes.

Figure 7:
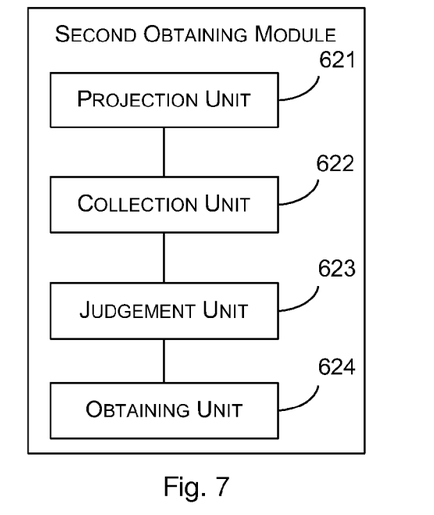
FIG. 7 shows a schematic diagram of a structure of a second obtaining module in Embodiment Three of the present disclosure.

As a preferred embodiment, referring to FIG. 7, the second obtaining module 62 may include: a projection unit 621 configured for projecting the first image; a collection unit 622 configured for collecting an projection image of the first image; a judgment unit 623 configured for judging whether the projection image of the first image reaches a predetermined projection requirement; and an obtaining unit 624 configured for triggering an adjustment and obtaining the adjustment instruction, if the projection image of the first image does not reach the predetermined projection requirement.

Figure 8:
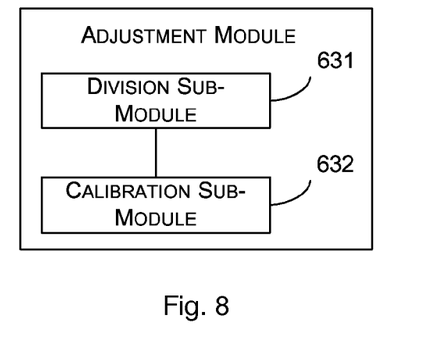
FIG. 8 shows a schematic diagram of a structure of an adjustment module in Embodiment Three of the present disclosure.

As a preferred embodiment, referring to FIG. 8, the adjustment module 63 may include: a division sub-module 631 configured for dividing the first image to a preset number of sub-images, the preset number being equal to a number of planes contained in the intersected planes; and a calibration sub-module 632 configured for calibrating each of the sub-images of the first image respectively, so as to obtain the calibrated sub-images as the second image.

Figure 9:
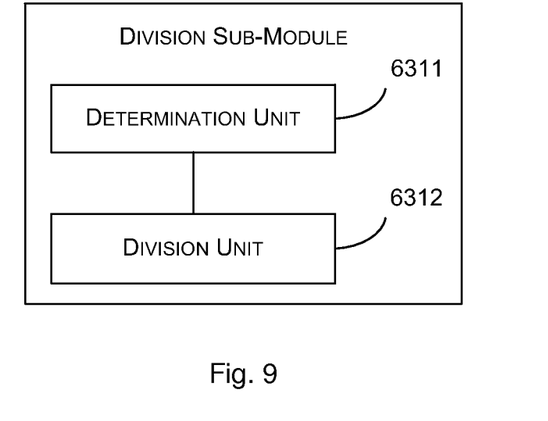
FIG. 9 shows a schematic diagram of a structure of a division sub-module in Embodiment Three of the present disclosure.

As a preferred embodiment, referring to FIG. 9, the division sub-module 631 may include: a determination unit 6311 configured for determining an imaging proportion of the first image on each of the intersected planes; and a division unit 6312 configured for dividing the first image to the preset number of sub-images, according to the imaging proportion of the first image on each of the intersected planes.

Further, the determination unit 6311 may be configured for detecting an edge of the first image intersected with the intersection line of the intersected planes; and determining the imaging proportion of the first image on each of the intersected planes, according to the edge of the first image intersected with the intersection line of the intersected planes.

Figure 10:
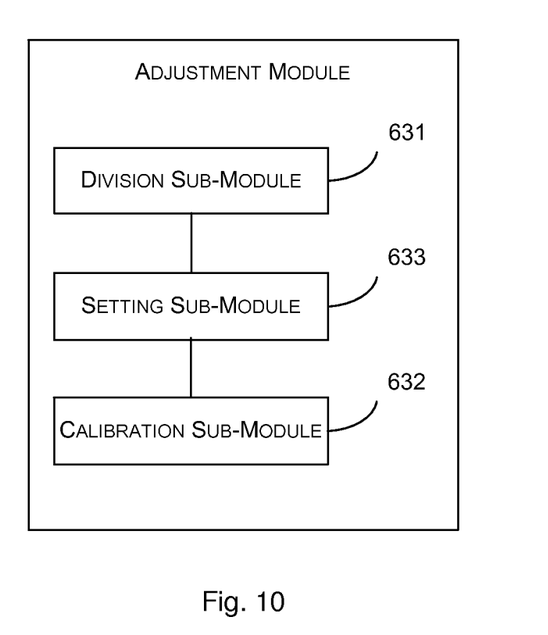
FIG. 10 shows a schematic diagram of a structure of another adjustment module in Embodiment Three of the present disclosure.

As a preferred embodiment, referring to FIG. 10, the adjustment module 63 may further include: a setting sub-module 633 configured for presetting a corresponding calibration matrix for each of the sub-images of the first image; the calibration sub-module 632 configured for determining the calibration matrix preset for each of the sub-images of the first image, and calibrating each of the sub-images of the first image according to the calibration matrix corresponding to each of the sub-images of the first image.

Further, the setting sub-module 633 may be configured for determining a relative distance between the projector and each of the intersected planes; and setting the corresponding calibration matrix for each of the intersected planes, according to the relative distance between the projector and each of the intersected planes; and determining a plane of the intersected planes corresponding to each of the sub-images of the first image, and using the calibration matrix corresponding to each of the intersected planes as a calibration matrix corresponding to the sub-image projected onto the plane.

In summary, the electronic device provided by the embodiment of the present disclosure adjusts the first image to the second image according to the obtained adjustment instruction, and projects the second image, so that when the second image projects onto the intersected planes formed by at least two planes, if the edge of the target image included in the second image is intersected with the intersection line of the intersected plane, the edge of the target image is or is approximately perpendicular to the intersection line of the intersection planes. Thus, the target image may be normally displayed and deformation may not occur.

It should be noted that when the projection device provided by the above embodiments is projecting images, division of the above functional modules are only as an example for illustration. In actual applications, the above function allocations may be implemented by different functional modules, i.e., the internal structure of the projection device may be divided into different functional modules so as to implement all or a part of functions as described above. In addition, the projection device and the projection method provided by the above embodiments belong to the same concept. Thus, the particular implementation of the projection device may refer to the method embodiments. The description thereof will be omitted here.

The above embodiments of the present disclosure are described only for illustration, but do not represent good or bad embodiments.

As understood by the skilled in the art, all or a part of steps for implementing the above embodiments may be implemented by hardware or by program for instructing related hardware. The program may be stored in a computer readable storage medium, which may be a readable-only memory, a magnetic disc or an optical disc etc.

The descriptions only relate to preferred embodiments of the present disclosure, but do not intend to limit the present disclosure. Various modifications, equivalents and improvements made to the present disclosure without departing from the spirit and scope of the present disclosure should fall into the protection scope of the present disclosure.

The invention claimed is:

1. A projection method, comprising:
obtaining a first image, and obtaining an adjustment instruction, wherein the first image corresponds to first content;
dividing the first image to a preset number of sub-images, the preset number being equal to a number of planes contained in the intersected planes, wherein dividing the first image to the preset number of sub-images comprises:
determining an imaging proportion of the first image on each of the intersected planes, comprising:
dividing a projection image of the first image to image areas on respective planes of the intersected planes, according to an edge of the first image intersected with the intersection line of the intersected planes;
calculating image areas on respective planes of the intersected planes; and
calculating the imaging proportion of the first image on each of the intersected planes, according to a proportion of the image areas on the respective planes of the intersected planes and a total area of the projection image of the first image; and
dividing the first image to the preset number of sub-images, according to the imaging proportion of the first image on each of the intersected planes;
determining a relative distance between the projector and each of the intersected planes, and setting the corresponding calibration matrix for each of the intersected planes, according to the relative distance between the projector and each of the intersected planes;
determining a plane of the intersected planes corresponding to each of the sub-images of the first image, and using the calibration matrix corresponding to each of the intersected planes as a calibration matrix corresponding to the sub-image projected onto the plane;

determining the calibration matrix preset for each of the sub-images of the first image, and calibrating each of the sub-images of the first image according to the calibration matrix corresponding to each of the sub-images of the first image, so as to obtain the calibrated sub-images as the second image, the second image comprising a target image corresponding to the first content; and projecting the second image;

wherein when the second image is projected onto intersected planes formed by at least two planes, if an edge of the target image is intersected with an intersection line of the intersected planes, the edge of the target image is or is approximately perpendicular to the intersection line of the intersection planes.

2. The method according to claim 1, wherein obtaining the adjustment instruction comprises:

projecting the first image;

collecting a projection image of the first image, and judging whether the projection image of the first image reaches a predetermined projection requirement; and triggering an adjustment and obtaining the adjustment instruction, if the projection image of the first image does not reach the predetermined projection requirement.

3. The method according to claim 1, wherein determining the imaging proportion of the first image on each of the intersected planes comprises:

detecting the edge of the first image intersected with the intersection line of the intersected planes; and determining the imaging proportion of the first image on each of the intersected planes, according to the edge of the first image intersected with the intersection line of the intersected planes.

4. An electronic device, comprising:

at least one memory, configured to store one or more executable instructions; and at least one processor, configured to perform the one or more executable instructions stored in the at least one memory to implement steps of:

obtaining a first image, the first image corresponds to first content;

obtaining an adjustment instruction;

dividing the first image to a preset number of sub-images, the preset number being equal to a number of planes contained in the intersected planes;

determining a relative distance between the projector and each of the intersected planes, and setting the corresponding calibration matrix for each of the intersected planes, according to the relative distance between the projector and each of the intersected planes;

determining a plane of the intersected planes corresponding to each of the sub-images of the first image, and using the calibration matrix corresponding to each of the intersected planes as a calibration matrix corresponding to the sub-image projected onto the plane;

determining the calibration matrix preset for each of the sub-images of the first image;

calibrating each of the sub-images of the first image according to the calibration matrix corresponding to each of the sub-images of the first image, so as to obtain the calibrated sub-images as the second image, the second image comprising a target image corresponding to the first content; and projecting the second image, wherein when the second image is projected onto intersected planes formed by at least two planes, if an edge of the target image is intersected with an intersection line of the intersected planes, the edge of the target image is or is approximately perpendicular to the intersection line of the intersection planes;

wherein the at least one processor divides the first image to the preset number of sub-images by:

determining an imaging proportion of the first image on each of the intersected planes; and dividing the first image to the preset number of sub-images, according to the imaging proportion of the first image on each of the intersected planes; and wherein the at least one processor determines the image proportion of the first image on each of the intersected planes by:

dividing a projection image of the first image to image areas on respective planes of the intersected planes, according to an edge of the first image intersected with the intersection line of the intersected planes;

calculating image areas on respective planes of the intersected planes; and calculating the imaging proportion of the first image on each of the intersected planes, according to a proportion of the image areas on the respective planes, of the intersected planes and a total area of the projection image of the first image.

5. The electronic device according to claim 4, wherein the at least one processor is further configured to perform the one or more executable instructions to implement steps comprising:

projecting the first image;

collecting a projection image of the first image;

judging whether the projection image of the first image reaches a predetermined projection requirement; and triggering an adjustment and obtaining the adjustment instruction, if the projection image of the first image does not reach the predetermined projection requirement.

6. The electronic device according to claim 4, wherein the at least one processor is further configured to perform the one or more executable instructions to implement a step of detecting the edge of the first image intersected with the intersection line of the intersected planes; and determining the imaging proportion of the first image on each of the intersected planes, according to the edge of the first image intersected with the intersection line of the intersected planes.

* * * * *